(12) United States Patent
Williams et al.

(10) Patent No.: US 8,331,855 B2
(45) Date of Patent: Dec. 11, 2012

(54) METHODS AND APPARATUS FOR PROCESS CONTROL WITH IMPROVED COMMUNICATION LINKS

(75) Inventors: Gary Williams, Gloucester (GB); Chris W. Rogers, Billingshurst (GB)

(73) Assignee: Invensys Systems, Inc., Foxboro, MA (US)

( * ) Notice: Subject to any disclaimer, the term of this patent is extended or adjusted under 35 U.S.C. 154(b) by 364 days.

(21) Appl. No.: 12/834,640

(22) Filed: Jul. 12, 2010

(65) Prior Publication Data

US 2012/0009868 A1    Jan. 12, 2012

(51) Int. Cl.
*H04B 7/185* (2006.01)
(52) U.S. Cl. .................... 455/13.1; 455/67.11
(58) Field of Classification Search ............ 455/7, 11.1, 455/12.1, 13.1, 15, 16, 67.11
See application file for complete search history.

(56) References Cited

U.S. PATENT DOCUMENTS

| | | | |
|---|---|---|---|
| 5,542,039 A | 7/1996 | Brinson et al. | |
| 5,673,401 A | 9/1997 | Volk et al. | |
| 5,786,119 A | 7/1998 | Sorriero et al. | |
| 5,950,006 A | 9/1999 | Crater et al. | |
| 5,987,506 A | 11/1999 | Carter | |
| 6,094,684 A | 7/2000 | Pallmann | |
| 6,104,391 A | 8/2000 | Johnston, Jr. et al. | |
| 6,133,914 A | 10/2000 | Rogers et al. | |
| 6,226,783 B1 | 5/2001 | Limondin et al. | |
| 6,349,274 B1 | 2/2002 | Kay et al. | |
| 6,429,885 B1 | 8/2002 | Saib et al. | |
| 6,609,147 B1 | 8/2003 | Matsuda et al. | |
| 6,658,850 B1 | 12/2003 | Travaly et al. | |
| 6,789,054 B1 | 9/2004 | Makhlouf | |
| 7,760,678 B2 * | 7/2010 | Sandhu et al. | 370/315 |
| 8,140,003 B2 * | 3/2012 | Laroia et al. | 455/11.1 |
| 2001/0007133 A1 | 7/2001 | Moriconi et al. | |
| 2001/0007183 A1 | 7/2001 | Weder | |
| 2001/0012775 A1 * | 8/2001 | Modzelesky et al. | 455/427 |

(Continued)

FOREIGN PATENT DOCUMENTS

EP        0411869 A2    2/1991

(Continued)

OTHER PUBLICATIONS

U.S. Appl. No. 09/721,409, filed Nov. 21, 2000, Venkatraman et al.

(Continued)

*Primary Examiner* — Tu X Nguyen
(74) *Attorney, Agent, or Firm* — Edward S. Jarmolowicz

(57) ABSTRACT

A control network carries information between nodes in a control system. For example, in one aspect of the invention, a control network includes first and second nodes, each of which is associated with at least one device in a control system, such as a controller, actuator, sensor, or otherwise. The first node is configured to wirelessly transmit information for simultaneous, or substantially simultaneous, transfer to the second node over at least two pathways. Those pathways can be made up of one or more network segments that interconnect nodes in the control network. In some cases, at least one of the at least two pathways is through a third and/or further nodes. Further, the first node can employ different radio channels, e.g., using different frequencies from one another, over at least one of the at least two pathways to transmit information to the second node.

35 Claims, 9 Drawing Sheets

U.S. PATENT DOCUMENTS

| | | |
|---|---|---|
| 2001/0025307 A1 | 9/2001 | Venkatraman et al. |
| 2001/0034777 A1 | 10/2001 | Venkatraman et al. |
| 2001/0034778 A1 | 10/2001 | Venkatraman et al. |
| 2001/0034779 A1 | 10/2001 | Venkatraman et al. |
| 2001/0034780 A1 | 10/2001 | Venkatraman et al. |
| 2001/0034781 A1 | 10/2001 | Venkatraman et al. |
| 2001/0037489 A1 | 11/2001 | Stripf et al. |
| 2001/0044836 A1 | 11/2001 | Venkatraman et al. |
| 2001/0052109 A1 | 12/2001 | Nagashima et al. |
| 2002/0013629 A1 | 1/2002 | Nixon et al. |
| 2002/0049865 A1 | 4/2002 | Charnell et al. |
| 2002/0067370 A1 | 6/2002 | Forney et al. |
| 2002/0093980 A1 | 7/2002 | Trebes |
| 2002/0133636 A1 | 9/2002 | Venkatraman et al. |
| 2002/0150156 A1 | 10/2002 | Calvin |
| 2004/0221289 A1 | 11/2004 | D'Souza et al. |
| 2006/0139161 A1* | 6/2006 | Beghelli .................. 340/514 |
| 2009/0193347 A1 | 7/2009 | Takahashi et al. |
| 2010/0291935 A1* | 11/2010 | Rudrapatna et al. .......... 455/450 |

FOREIGN PATENT DOCUMENTS

| | | |
|---|---|---|
| EP | 0592921 | 4/1994 |
| EP | 0640905 | 3/1995 |
| EP | 0660231 | 6/1995 |
| EP | 0906595 | 4/1999 |
| EP | 1006691 | 6/2000 |
| WO | 2010138412 A1 | 12/2010 |

OTHER PUBLICATIONS

U.S. Appl. No. 11/260,859, filed Oct. 28, 2005, Keyghobad et al.

Hiertz, Guido et al., "IEEE 802.11s: The WLAN Mesh Standard," IEEE Wireless Communications, pp. 104-111, Feb. 2011.

User Guide for IntelaTrac 2000: Automated Field Data Collection Solutions, Rev. 1.0, Nov. 30, 1999.

* cited by examiner

CONTROL

| P2P_TEST.THIS_NODE | 1 |
| P2P_TEST.OTHER_NODE | 2 |
| P2P_TEST.ENABLE_SEND | TRUE |
| P2P_TEST.FIRST_SEND | 1 |
| P2P_TEST.LAST_SEND | 50 |
| P2P_TEST.ENABLE_RECV | TRUE |
| P2P_TEST.FIRST_RECV | 1 |
| P2P_TEST.LAST_RECV | 50 |
| P2P_TEST.NUMBER | 32 |
| P2P_TEST.SEND_VALUE | 1 |
| P2P_TEST.FILTER | 95 |
| P2P_TEST.RESET | FALSE |

STATUS

| P2P_TEST.TIMESTAMP | 94241375 |
| P2P_TEST.SEND_TIME | 1375 |
| P2P_TEST.UPDATE_RAW | 5400660 |
| P2P_TEST.TRANSIT_RAW | 490087 |
| P2P_TEST.TOTAL_RAW | 5890747 |
| P2P_TEST.UPDATE_FILT | 5780660 |
| P2P_TEST.TRANSIT_FILT | 400061 |
| P2P_TEST.TOTAL_FILT | 6180721 |
| P2P_TEST.UPDATE_HIGH | 8400840 |
| P2P_TEST.TRANSIT_HIGH | 1520148 |
| P2P_TEST.TOTAL_HIGH | 9440986 |
| P2P_TEST.FIRST_TIMESTAMP | 12637117 |
| P2P_TEST.LAST_TIMESTAMP | 4750099 |
| P2P_TEST.SEND_SENT | 2529899 |
| P2P_TEST.SEND_ACK | 2529899 |
| P2P_TEST.SEND_DELTA | 0 |
| P2P_TEST.SEND_ERROR | 0 |
| P2P_TEST.SCAN_USED | 52 |
| P2P_TEST.TO_TR_OO_OR_1L_1R_2L_2R | 11111111 |

COMMUNICATION MODULES

P2P_TEST.S2L
TR_SLOT_STATUS
TRUE — 0       00 — TRUE
1 — CHASSIS   PASS — TRUE
5 — SLOT      FAIL — FALSE
              ACTIVE — TRUE
              LOADFUSE — FALSE
              INSTALLED — TRUE
              VOTER FAULT — FALSE
              DVD_ENABLED — FALSE
              NOGOOD — FALSE

P2P_TEST.S2R
TR_SLOT_STATUS
TRUE — 0       00 — TRUE
1 — CHASSIS   PASS — TRUE
6 — SLOT      FAIL — FALSE
              ACTIVE — TRUE
              LOADFUSE — FALSE
              INSTALLED — TRUE
              VOTER FAULT — FALSE
              DVD_ENABLED — FALSE
              NOGOOD — FALSE

P2P_TEST.S3L
TR_SLOT_STATUS
TRUE — 0       00 — TRUE
1 — CHASSIS   PASS — TRUE
7 — SLOT      FAIL — FALSE
              ACTIVE — TRUE
              LOADFUSE — FALSE
              INSTALLED — TRUE
              VOTER FAULT — FALSE
              DVD_ENABLED — FALSE
              NOGOOD — FALSE

P2P_TEST.S3R
TR_SLOT_STATUS
TRUE — 0       00 — TRUE
1 — CHASSIS   PASS — TRUE
8 — SLOT      FAIL — FALSE
              ACTIVE — TRUE
              LOADFUSE — FALSE
              INSTALLED — TRUE
              VOTER FAULT — FALSE
              DVD_ENABLED — FALSE
              NOGOOD — FALSE

FIG. 5

FROM FIG. 6A

- P2P_TEST.SEND_21 — 1101621000
- P2P_TEST.SEND_22 — 1101622000
- P2P_TEST.SEND_23 — 1101623000
- P2P_TEST.SEND_24 — 1101624000
- P2P_TEST.SEND_25 — 1101625000
- P2P_TEST.SEND_26 — 1101626000
- P2P_TEST.SEND_27 — 1101627000
- P2P_TEST.SEND_28 — 1101628000
- P2P_TEST.SEND_29 — 1101629000
- P2P_TEST.SEND_30 — 1101630000

- P2P_TEST.SEND_31 — 1101631000
- P2P_TEST.SEND_32 — 1101632000
- P2P_TEST.SEND_33 — 1101633000
- P2P_TEST.SEND_34 — 1101634000
- P2P_TEST.SEND_35 — 1101635000
- P2P_TEST.SEND_36 — 1101636000
- P2P_TEST.SEND_37 — 1101637003
- P2P_TEST.SEND_38 — 1101638003
- P2P_TEST.SEND_39 — 1101639002
- P2P_TEST.SEND_40 — 1101640002

- P2P_TEST.SEND_41 — 1101641002
- P2P_TEST.SEND_42 — 1101642002
- P2P_TEST.SEND_43 — 1101643002
- P2P_TEST.SEND_44 — 1101644002
- P2P_TEST.SEND_45 — 1101645002
- P2P_TEST.SEND_46 — 1101646001
- P2P_TEST.SEND_47 — 1101647000
- P2P_TEST.SEND_48 — 1101648000
- P2P_TEST.SEND_49 — 1101649000
- P2P_TEST.SEND_50 — 1101650000

FIG. 6B

METHODS AND APPARATUS FOR PROCESS CONTROL WITH IMPROVED COMMUNICATION LINKS

FIELD

This patent application generally relates to process control and, more particularly, to methods and apparatus for networking in process control and other control systems.

BACKGROUND

Control systems typically involve the control of a device, process, or system by monitoring one or more of its characteristics. Control is used, for example, to insure that output, processing, quality and/or efficiency remain within desired parameters over the course of time. In many control systems, digital data processing or other automated apparatus monitor the device, process or system and automatically adjust its operational parameters. In other control systems, such apparatus monitor the device, process or system and display alarms or other indicia of its status, health, and other characteristics, leaving responsibility for adjustment to the operator or, in acute cases, triggering safety systems designed to prevent failures. Further, such apparatus track changes in those devices, processes, or systems, including for example operator-implemented changes to their configurations.

Control is used in a number of fields. Process control, for example, is employed in the manufacturing sector for process, repetitive and discrete manufactures, though, it also has wide application in utility and other service industries. Environmental control finds application in residential, commercial, institutional and industrial settings, where temperature and other environmental factors must be properly maintained. Control is also used in articles of manufacture, from toasters to aircraft, in order to monitor and control device operation.

Modern day control systems typically include a combination of field devices, controllers, workstations and other digital data processing apparatus, the functions of which may overlap or be combined. Field devices include temperature, flow and other sensors or transmitters that measure characteristics of the subject device, process or system. They also include valves, positioners, and other actuators that mechanically, electrically, magnetically, or otherwise effect the desired control. Increasingly, field devices are of the "intelligent" variety, including, for example, an on-board processor programmed to execute typical process control functions, as described in commonly owned U.S. Pat. No. 6,788,980 ("Methods and apparatus for control using control devices that provide a virtual machine environment and that communicate via an IP network"), which is hereby incorporated by reference in its entirety.

Controllers generate settings for actuator-type field devices based on measurements from sensor-type field devices (though such control can be executed by smart field devices and other elements of the system as well). Controller operation is typically based on a "control algorithm" that maintains a controlled system at a desired level, or drives it to that level, by minimizing differences between the values measured by the sensors and, for example, a setpoint defined by the operator.

Workstations, control stations and the like are typically used to configure and monitor the process as a whole. They are often also used to execute higher-levels of process control, e.g., coordinating groups of controllers and responding to alarm conditions signaled by them.

In a food processing plant, for example, a workstation coordinates controllers that actuate conveyors, valves, and the like, to transport soup stock and other ingredients to a processing vessel. The workstation also configures and monitors the controllers that maintain the contents of that vessel at a simmer or low boil. The latter operate, for example, by comparing measurements of vapor pressure in the processing vessel with a desired setpoint. If the vessel pressure is too low, the control algorithm may call for incrementally opening the heating gas valves, thereby, driving the pressure and boiling activity upwards. As the pressure approaches the desired setpoint, the algorithm requires incrementally leveling the valves to maintain the roil of the boil.

The field devices, controllers, workstations and other components that make up a control system typically communicate over heterogeneous media. Field devices connect with controllers, for example, over dedicated "fieldbuses" operating under proprietary or industry-specific protocols. Examples of these are FoxComm™, Profibus, ControlNet, ModBus®, DeviceNet, Foundation Fieldbus, among others. The controllers themselves may be connected to one another, as well as to workstations, via backplane or other proprietary high-speed dedicated buses, such as Nodebus™. Communications among workstations and plant or enterprise-level processors may be via Ethernet networks or other Internet Protocol (IP) networks.

Wireless technology is an attractive option for implementing control system communications, but current approaches invite improvement.

Accordingly, an object of the invention is to provide improved methods and apparatus for process and other control systems. A related aspect of the invention is to provide such methods and apparatus as improve communications within such systems. A further object is to provide robust network connections for use in process and other control environments, for example as a replacement or supplement to existing connections between field devices, controllers, workstations, and other devices. A related object is to provide such connections and networks utilizing them as reduce the complexity and cost attendant to prior art process control and other control systems.

SUMMARY

The foregoing are among the objects attained by the invention, aspects of which provide improved methods and apparatus for networking in control systems. In one such aspect of the invention, an improved control network includes a first node associated with at least one device (e.g., a controller, an actuator, a sensor, or otherwise) in a control system and a second node associated with at least one other device in the system. According this aspect of the invention, the first node wirelessly transmits information for simultaneous, or substantially simultaneous, transfer over at least two communication pathways to the second node.

In further aspects of the invention, the first node wirelessly transmits information for substantially simultaneous transfer over at least two pathways to the second node by broadcasting that information to other nodes in the control network that are in a transmission range of the first node (e.g., including the second node, if in range), which forward it towards the destination node. In other aspects of the invention, the first node does so by wirelessly transmitting that information to at least two selected nodes in the control network that are in a transmission range of the first node (e.g., the first node can select two (or more) nodes, one of which may be the destination node, and address the information to those two (or more)

nodes, which can then forward the information towards the destination node, if necessary).

Related aspects of the invention provide an improved control network, e.g., as described above, in which the pathways over which the first node redundantly transmits information to the second node are defined by one or more network segments (e.g., contiguous network segments) that interconnect and extend between pairs of nodes in the control system. Thus, in related aspects, one or more of the pathways extends through at least a third node (or additional nodes), which may be associated with another device in the control system or may be a relay node that serves to relay messages but does not act as a destination.

Related aspects of the invention provide an improved control network, e.g., as described above, in which the first node wirelessly transmits information over at least one segment of one of the pathways using at least two different radio channels, which for example use different frequencies or frequency bands from one another. In related aspects of the invention, such node employs different wireless protocols on the radio channels.

Further aspects of the invention provide an improved control network, e.g., as described above, in which at least one device associated with the first node communicates status, health, critical event, safety and/or other system management information to at least one device associated with the second node. Such devices can also communicate change-tracking information to one another, e.g., regarding changes in the configuration of one of the devices, the process, and/or the system that were implemented by an operator or other source.

Further aspects of the invention provide an improved control network, e.g., as described above, in which the devices associated with at least the first and second nodes form part of a control loop operating in the system, e.g., a control loop that maintains the control system at a desired level or drives it to that level, as a function of one or more measured values and one or more setpoints. Such devices can include a controller, for example, and/or a communications module associated therewith, while others can include actuators, sensors, transmitters, positioners, or other control device.

Thus, for example, in an improved control network as described above, the controller associated with the first node and the control device associated with the second node can form at least a portion of the aforementioned control loop.

Related aspects of the invention provide an improved control network, e.g., as described above, in which at least one of the first and second nodes initiate communications with one another over the network segments, that is, in the manner of a peer-to-peer connection.

According to further aspects of the invention, the first node of a control network, as described above for example, wirelessly transmits information for simultaneous, or substantially simultaneous, transfer over at least three pathways to the second node. At least one of the pathways, according to related aspects of the invention, can extend through a third node, and at least one can be through a fourth node, fifth node, or more.

Further aspects of the invention provide an improved control network, e.g., as described above, in which nodes are controllers and/or field devices, such as sensors or actuators.

In another aspect of the invention, an improved node is provided for use in a control network that has a plurality of nodes. The node includes a control device—such as a controller, sensor, actuator, or otherwise—and a communication module. The communications module wirelessly transmits information for simultaneous, or substantially simultaneous, transfer over at least two pathways to the at least one other node.

In related aspects of the invention, an improved network node, e.g., as described above, includes a communication module that wirelessly transmits information for substantially simultaneous transfer over at least two pathways to the at least one other node by broadcasting the information to nodes in the control network that are in a transmission range of the network node (e.g., including the at least one other node, if in range). In other aspects of the invention, that communication module does so by wirelessly transmitting the information to at least two selected nodes in the control network that are in a transmission range of the network node (e.g., by selecting and addressing the information to those nodes, or otherwise, as previously mentioned).

Related aspects of the invention provide an improved node in a control network, e.g., as described above, in which the pathways are each defined by one or more network segments that interconnect and extend between pairs of nodes in the control network. Such pathways can extend through a third node, or more, e.g., as previously described.

Related aspects of the invention provide an improved node in a control network, e.g., as described above, in which the node's communication module includes one or more radios that provide, collectively, a plurality of radio channels for wirelessly transmitting information over at least one segment of the at least two pathways to the at least one other node. At least two of those radio channels can use different frequencies or frequency bands from one another. In related aspects, such a node can employ at least two different wireless protocols to wirelessly transmit the same information simultaneously, or substantially so, to the at least one other node.

Related aspects of the invention provide an improved node in a control network, e.g., as described above, that transmits and/or receives status, health, critical event, safety, change-tracking and/or other system management information with at least one other node.

Related aspects of the invention provide an improved node in a control network, e.g., as described above, in which the control device of the node may form at least part of a control loop operable to maintain a control system at a desired level and/or drive it to that level, as a function of one or more measured values and one or more setpoints.

In further aspects of the invention, an improved node in a control network is provided, e.g., as described above, in which both the node and the at least one other node are capable initiating wireless communications with one another or otherwise operate in a peer-to-peer manner with one another.

Related aspects of the invention provide an improved node in a control network, e.g., as described above, in which the node wirelessly transmits information for simultaneous, or substantially simultaneous, transfer to the at least one other node over at least three pathways, or more. The node can use pathways that go through one or more intermediate nodes in the system before arriving at the at least one node.

Yet further aspects of the invention provide methods, e.g., method of communicating information between first and second nodes in a control network, that parallel the operations described above.

These and other aspects of the invention are evident in the drawings and discussion that follows.

BRIEF DESCRIPTION OF THE DRAWINGS

A more complete understanding of the invention may be attained by reference to the following detailed description in conjunction with the drawings, in which:

FIGS. 5 and 6 are controller panel sheets used to control and monitor communications among wireless nodes in a system according to the invention.

DETAILED DESCRIPTION

Figure 1:
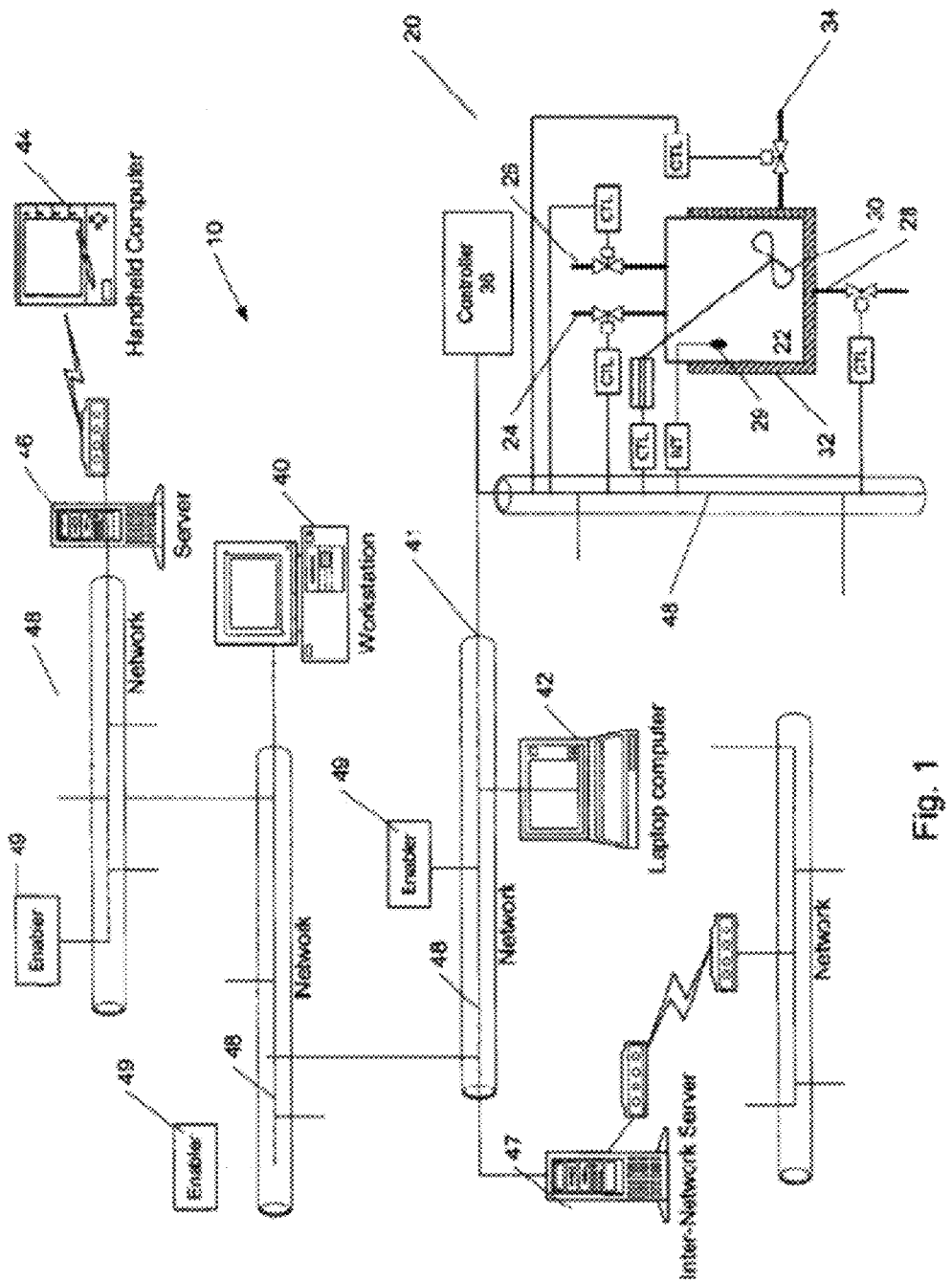
FIG. 1 depicts a control system incorporating a control network in accord with one practice of the invention.

FIG. 1 depicts a process control system 10 according to one practice the invention. The system includes networked control devices that monitor and control a hypothetical mixing process that utilizes mixing chamber 22, fluid inlets 24, 26, fluid outlet 28, paddle 30, cooler 32, and cooler inlet 34. Though illustrated and described below for use in connection with process control, those skilled in the art will appreciate that apparatus and methods according to the invention can be used in connection any industrial, manufacturing, service, environmental or other process, device or system amenable to monitoring or control (hereinafter, collectively, "control").

The networked control devices of the illustrated embodiment include actuators, such as the valves depicted as controlling inlets and outlets 24-28 and 34. A further actuator is shown controlling paddle 30. These and other actuators are constructed and operated in the conventional manner known in the art, as modified in accord with the teachings hereof. The actuators operate under control of respective field device controllers, labeled CTL, that are also constructed and operated in the conventional manner to provide initialization, signal conditioning and communications functions.

Rather than using separate controllers CTL, the actuators can be of the intelligent variety and can include integral microprocessors or other digital data processing apparatus for control, initialization, signal conditioning, communications and other control-related functions. For sake of convenience, the label CTL is used regardless of whether the control-related functionality is integral to the actuators (e.g., as in the case of intelligent actuators) or otherwise.

The networked control devices of the illustrated embodiment also include sensors, such as illustrated sensor 29 that monitors a temperature, level or other characteristic of fluid in chamber 22. The sensor 29, as well as other sensing apparatus utilized by the system, are constructed and operated in the conventional manner known in the art, as modified in accord with the teachings hereof. They can be coupled to the control network via a transmitter or other interface device INT that, too, is constructed and operated in the conventional manner, as modified by the teachings hereof. The interface devices facilitate initialization, signal conditioning and communications between the sensors and the control system. As above, one or more sensors can be of the intelligent variety, incorporating integral microprocessors or other digital data processing capabilities for initialization, signal conditioning, communications and other control-related functions. Here, too, the label INT is used in reference to the control-related functionality, regardless of whether embodied in an intelligent transmitter or otherwise.

The networked control devices, e.g., in addition to the actuators and sensors, include one or more controllers 36 that monitor and control respective aspects of the hypothetical mixing process in the conventional manner, as modified in accord with the teachings hereof. The controllers can comprise mainframe computers, workstations, personal computers, special-purpose hardware or other digital data processing apparatus capable of performing conventional monitoring and control functions. Controllers may be operated in the conventional manner known in the art, as modified by the teachings hereof. Preferred controllers are constructed and operated in the manner of the control processors ("CP") commercially available from the assignee hereof, such as Triconex® (a/k/a "Tricon") and Trident™ controllers, as modified in accord with the teachings herein.

The control system 10 includes a variety of control devices that serve as user interfaces and that provide configuration and/or control functions, all in the conventional manner as modified in accord with the teachings hereof. Illustrated for these purposes are workstation 40, laptop computer 42 and handheld computer 44, and enabler 49. These control devices can provide configuration and control functions directly, as in the case of workstation 40, or in cooperation with server devices, e.g., as in the case of handheld computer 44 and server 46. These control devices, in cooperation with controllers, actuators, sensors, and other devices, can also provide health, status, critical event, and safety monitoring functions, as well as reporting/logging/recording and/or other change-tracking functions, e.g., for tracking the source and history of configuration and other changes in the system implemented by an operator or otherwise. The illustrated apparatus can couple with the control network directly, e.g., via bus or network connection, or indirectly, e.g., via satellite, wireless connection or modem connection.

The control devices 36-46, CTL and INT are coupled for communications via one or more segments of network 48. Those segments may comprise wired or other physical media links of the type known in the art suitable for carrying information (e.g., in packets or otherwise) between the nodes. Wireless segments, in which the physical media comprises radio frequency electromagnetic waves or other over-air link, are preferably constructed and operated in accord with the teachings hereof. Wired and other segments, e.g., where the links are wire-based, optical fiber based, or based on other media, are constructed and operated in the conventional manner known in the art, as adapted in accord with the teachings hereof. For sake of simplicity, the term "segment" is typically used herein to refer to a physical media link between one node and one or more other nodes. Preferred such network segments are IP-based such as, by way of non-limiting example, Ethernets. Such network segments may also operate in accord with Foundation Fieldbus, HART®, FoxComm™, Modbus®, Lonworks®, Profibus, CAN bus, other protocols/standards known in the industry, or otherwise. The network segment(s) can, as shown in the drawing, be formed in Internets, wide area networks, local area networks, and other arrangements known in the art, as adapted in accord with the teachings hereof. They may also include high and/or low bandwidth components, such as phone lines, and low and/or high latency components, such as geosynchronous satellite networks.

Figure 2:
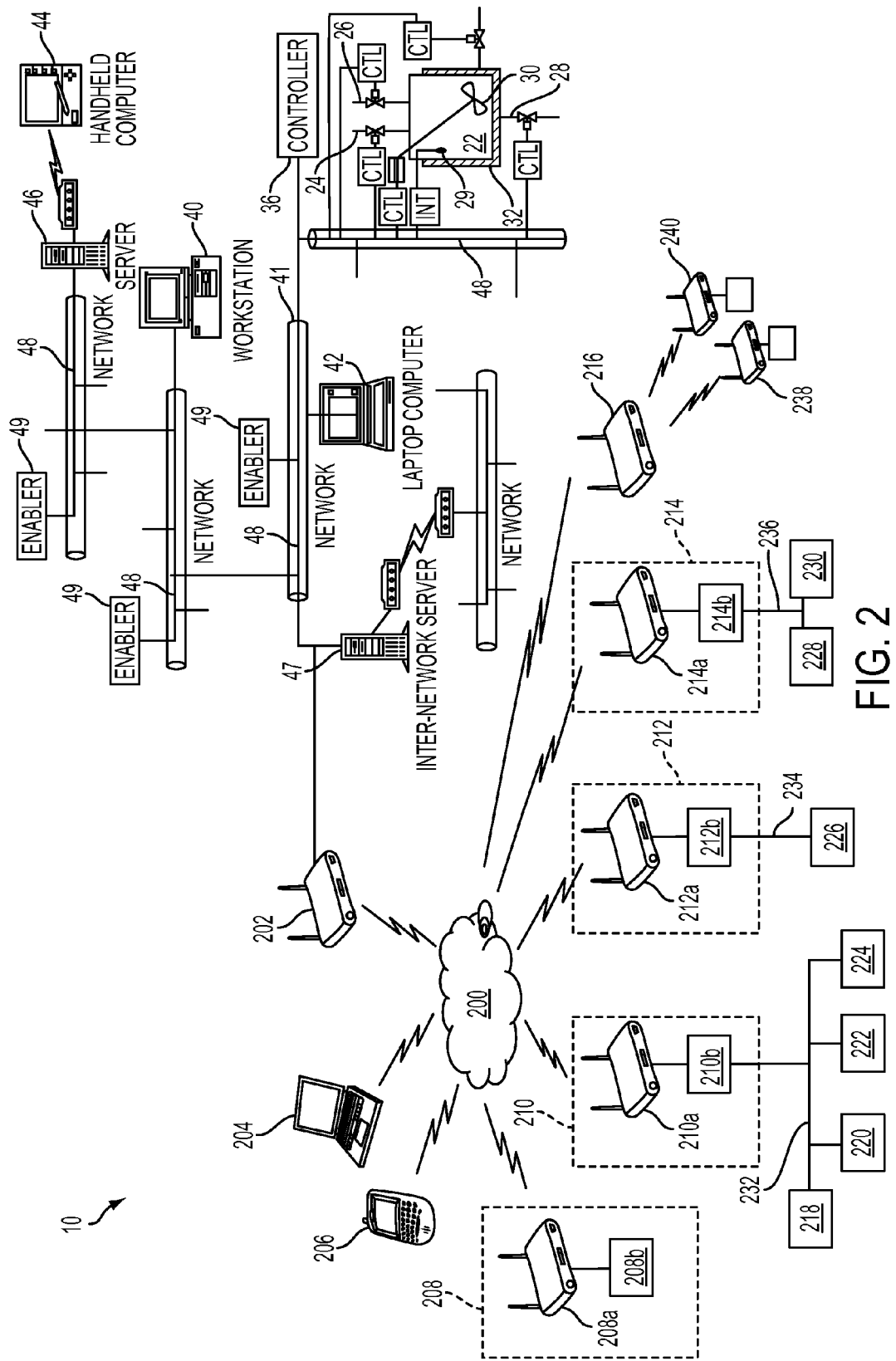
FIG. 2 depicts in greater detail a control system incorporating a network with wireless segments in accord with one practice of the invention.

FIG. 2 depicts an exemplary portion 200 of a network of the type described above in the control system 10 that is made up of wireless network segments communicatively coupling wireless nodes 202-216 with one another and to the segments of network 48 described above. In the illustrated embodiment, such wireless nodes include laptop 204, e.g., operating as described above, and handheld device 206, which may be a personal digital assistant, cell phone or other handheld device. The illustrated embodiment also includes wireless nodes 208-214, which are comprise wireless communication modules 208a, 210a, 212a, 214a associated with control devices 208b, 210b, 212b and 214b, respectively. Yet other wireless nodes in the wireless network include wireless access point 202, which communicatively couples other wireless nodes with control devices 36-46 on network segment(s) 48, or to other devices. Yet further, wireless node 216 is a relay (also referred to as a repeater), e.g., transferring information to and from wireless nodes 238 and 240, which would otherwise be located outside the transmission range of the aforementioned wireless nodes 202-214. In the illustrated embodiment, wireless node 216 is a wireless communications module that is not associated with a control device, in contrast to wireless nodes 208-214.

Those skilled in the art will appreciate that the wireless nodes illustrated in FIG. 2 may be located throughout a plant or other facility and/or in different plants, facilities. Hence, in some implementations, the wireless network 200 may extend across areas within a plant and/or across multiple plants.

The control devices 208b-214b that are associated with wireless nodes 208-214, respectively, include actuators, sensors, controllers (such as, by way of non-limiting example, Triconex® and Trident™ controllers), workstations, and other control devices of the kind described previously in connection with FIG. 1. In the illustrated embodiment, control device 208b is an intelligent field device, such as an actuator or sensor, while control device 210b is controller which is connected to other control devices 218-224 via control bus 232, which operates in accord with Ethernet, Foundation Fieldbus, Modbus, or any of the aforementioned communication protocols. Likewise, control device 212b is a controller connected to another control device 226 via control bus 234, while control device 214b is a controller connected to control devices 228-230 via control bus 236. Those control devices 210b-214b operate in the manner previously described, e.g., in connection with controller 36 of FIG. 1, to execute a control algorithm to monitor and/or control one or more of the other control devices on their control bus, one or more other control devices elsewhere in the control system, and/or one or more other aspects of the control system.

Figure 3:
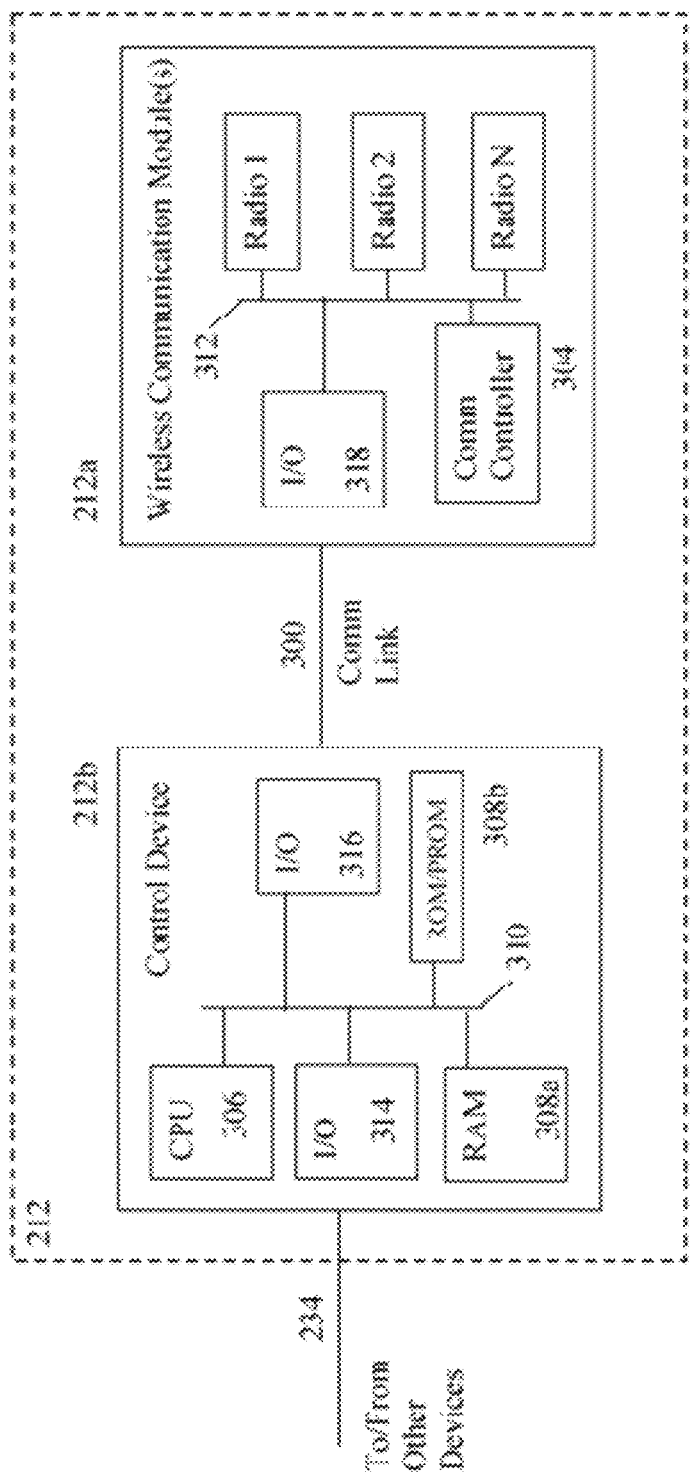
FIG. 3 depicts in more detail a wireless node of the network of FIG. 2.

FIG. 3 depicts wireless node 212 in more detail. In the illustrated embodiment, wireless node 212 is made up of wireless communication module 212a and control device 212b. The wireless communication module 212a contains one or more radios (labeled "1" to "N") for wireless transmission and reception of information, a communication controller for controlling the flow of information and processing incoming and outgoing information, and input/output (I/O) circuitry 318 for interfacing with communications link 300 to the control device 212b and/or other devices.

The one or more radios are capable of wirelessly transmitting and/or receiving radio signals in accord with known wireless protocols, e.g., using known modulation techniques, data encoding, and/or frequencies, as modified by the teachings hereof. Examples of such protocols include the wifi/wireless Ethernet standards (802.11a/b/g/n/s), frequency modulation (FM) radio links, wpan protocol (e.g., 802.15.4) and/or the Microsoft DirectBandF network. Still other supported protocols include Wibree and Ultra-wideband (UWB), as well as industrial wireless protocols, such as the ISA-SP100 standards (e.g., SP100.11a), Wireless HART® and Zigbee®, all by way of non-limiting example.

One or more of the radios may be arranged to provide one or more channels operating at different center frequencies from one another (e.g., either at the same time or time-multiplexed) or in different frequency bands. For example, wireless Ethernet (e.g., 802.11a/b/g/n/s) can be configured to utilize one or more channels in the 2.4 Ghz or 5 Ghz frequency bands. Such distributed-frequency operation may, in some circumstances, advantageously lessen the risk of a communication problems due to electromagnetic interference from natural (e.g., atmospheric activity), man-made (e.g., airwave congestion, jamming), or other sources.

With continued reference to FIG. 3, the communication controller 304 is made up of an embedded processor or other logic circuitry, which provides control and supervisory functions for the wireless communication module 212a. The communication controller 304 may buffer incoming data and/or unpack or extract information from that data (e.g., by unpacking packetized data, decompressing data, and so on) and/or execute error checking routines, e.g., in accordance with a selected protocol, to the extent such functions are not performed by the radio equipment itself. For outbound communications, the communication controller 304 assembles outgoing data that is received from the control device 212b in accordance with one or more selected protocols and sends such formatted data to one or more of the radios for transmission. In some cases, the communication controller 304 formats the same data in accord with two or more different protocols, allowing the communication module 212a to send the same data to a recipient with different protocols, and/to use such different protocols for one or more of its radios. The communication controller 304 also provides data encryption/decryption functions. A bus 312 or other communication pathway communicatively couples the communication controller 304, radios, and/or other components in the communication module 212a. It should be appreciated that while the radios are illustrated as part of the communication module 212a, they may be physically packaged as separate units.

The control device 212b depicted in FIG. 3 is an intelligent, programmable controller configured in a conventional manner, as modified by the teachings hereof. In alternate embodiments, it may comprise other functionality of the type known in the art, such as actuators and sensors, or that otherwise serves to monitor and/or control aspects of a control system, all as adapted in accord with the teachings hereof. Illustrated control device 212b includes a central processing unit (CPU) 306 and memory (random access memory 308a and persistent read-only memory 308b) for storing an embedded operating system, program/configuration data, control algorithms, messages from other nodes, and/or other information. A bus 310 or other link communicatively couples these and/or other components in the control device 212b.

In the illustrated embodiment, the control device 212b further includes I/O circuitry 314 that provides an interface to a control bus 234, which connects the control device 212b with device 226, as shown and described previously in connection with FIG. 2. I/O circuitry 316 provides an interface to a communications link 300 to wireless communications module 212a.

It should be appreciated that while in the illustrated embodiment the communication link 300 is a point-to-point connection, in other embodiments, a multi-drop communications pathway may be employed, thus connecting multiple control devices to one wireless communications module 212b. In alternate embodiments the control device 212b and communication module 212a may be integrated to eliminate the I/O interface between them (e.g., by coupling buses 310 and 312, or otherwise).

Further, those skilled in the art will understand that the control device 212b shown in FIG. 3 is merely one non-limiting example of devices of the type that are associated with wireless nodes in a control system, and that, accordingly, such devices can vary widely in function.

Moreover, while the foregoing illustrates at least some typical types of wireless nodes, it should be appreciated that any device(s) or component(s) capable or sending and/or receiving information wirelessly can function as a wireless node in control system 10. Some wireless nodes may be associated with control devices in the control system. Other wireless nodes, such as wireless communication module 216 in FIG. 2, may not be associated with control devices. Such wireless nodes may function as repeater nodes (also referred to herein as "rebroadcast" nodes) servicing other destinations. Those skilled in the art will appreciate that virtually any number and combination of wireless nodes can be employed in such a system.

Figure 4:
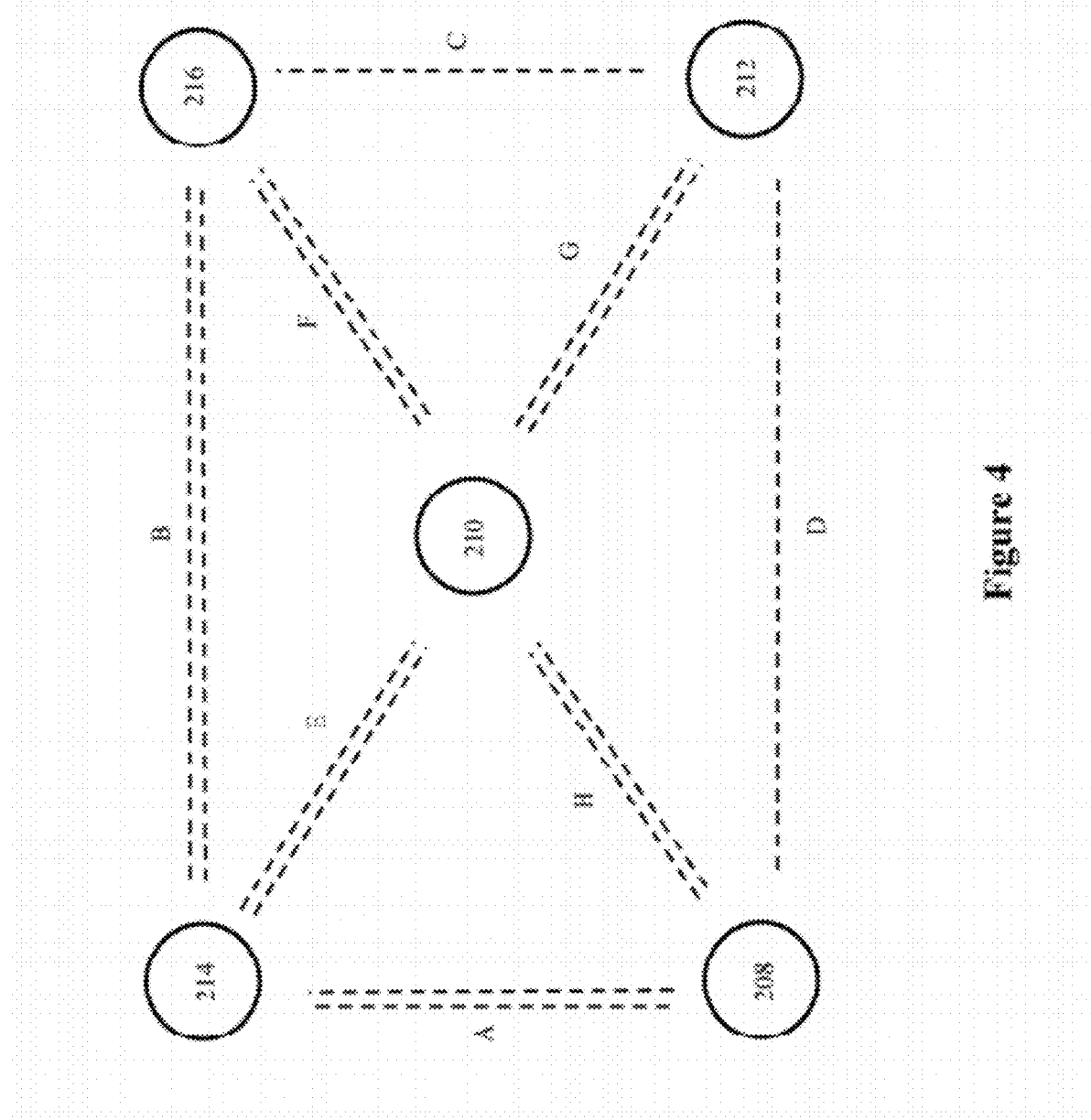
FIG. 4 is an exemplary network diagram of the wireless segments shown in FIG. 2.

FIG. 4 is an exemplary network diagram of selected ones of the wireless nodes and wireless segments described above in connection with FIGS. 2 and 3. For clarity, the illustrated embodiment depicts selected ones of the wireless nodes 208-216, although those skilled in the art will appreciate that other wireless nodes, such as wireless nodes 202-206 described above, are also incorporated into the wireless network, e.g., in a manner consistent with the teachings herein.

More particularly, FIG. 4 depicts several wireless segments A to H, each represented by single or double dotted lines extending between nodes 208-216. For example, the pair of dotted lines (H) between wireless node 208 and wireless node 210 represents a wireless network segment between those two nodes that has two radio channels, which may operate at different frequencies. The single dotted line (D) between wireless nodes 208 and 212 represents a wireless network segment with a single radio channel between those wireless nodes. It should be appreciated that the arrangement of single and double channels is illustrative only, as other implementations consistent with the teachings hereof are possible (e.g., in which three or more channels are used).

The wireless segments A to H define multiple potential communication pathways between a given wireless node that initiates a transmission of information (an originating node) and a wireless node that receives that information (a destination node). In the illustrated embodiment, an originating wireless node uses a plurality of different pathways to transmit information to another node, referred to herein as a destination node.

For example, in one embodiment, wireless node 208 (an originating node, in this example) transmits information to wireless node 212 (e.g., a destination node, in this example) by sending that information over wireless segment D (e.g., a first pathway) as well as wireless segments HG (e.g., a second pathway) by executing two wireless transmissions of information. Originating node 208 selects those nodes to which it will wirelessly transmit information, e.g., based on a stored or discovered network topology, a predetermined routing procedure, or other criteria. In this example, one of those transmissions is addressed to destination node 212 and one is addressed to wireless node 210 for relay to destination node 212. While in the illustrated embodiment segment G is a wireless segment, in other embodiments segment G may be a wired link and thus wireless node 210 may relay the information (that is the information receive wirelessly from node 208) to node 212 via a wired transmission medium. The originating node may not know the ultimate pathway(s) that its two or more messages may take. Rather, in some cases, the originating node wirelessly transmits the information to two or more other wireless nodes (one of those wireless nodes preferably, but not necessarily, being the destination node). Those wireless nodes can then forward the information to the destination node or another intermediate node, as appropriate and in accord with a predetermined routing procedure. In other cases, the originating node may know the topology of the wireless nodes, as mentioned above and use that information to determine, e.g., in advance, the pathway the information will traverse.

In other embodiments, an originating node effects those transmissions by broadcasting information addressed to the destination node. Any nodes that are in range of the originating node receive the information (e.g., including the destination node, if in range). Those wireless nodes, other than the destination node, forward the information it towards destination node, e.g., based on a stored or discovered network topology, or a predetermined routing procedure, or other criteria.

In the foregoing example, wireless node 210 functions as an intermediate node, receiving data from originating node 208 over wireless segment H and relaying that information to destination node 212 over wireless segment G (or, in alternate embodiment, wired segment G). Hence, the destination node 212 receives the same information from the originating node 208 via two different pathways. The originating node, or another node, can embed an identifier into both sets of information before transmitting them. The destination node can use such information to associate those redundant sets of information with one another. In other embodiments, the wireless nodes may employ a path identifier (e.g., pathway D or pathway HG) for tracking, diagnostic, or other purposes. Further, it should be appreciated that the originating node may utilize more than two pathways to reach the destination node. To continue the foregoing example, for instance, originating node 208 may transmit the same information to destination node 212 over pathways AEG, ABC, HFC, AEFC, and so on, in addition to those already mentioned above.

In many cases, the originating node wirelessly transmits information for simultaneous (or substantially simultaneous) transfer over two or more pathways to the destination node. To continue with the foregoing example, originating node 208 transmits information for simultaneous, or substantially simultaneous, transfer over pathways D and HG to destination node 212. (As described above, the originating node can transmit the information by broadcasting it to other nodes, or by transmitting it to two or more selected nodes, e.g., at the same time, or with another approach.) In this regard, the term 'substantially' indicates that the transfer of information may not be exactly simultaneous but approximately so. Differences in the time of transfer may be the result of the processing bottlenecks in the originating and/or intermediate nodes, pipeline/queuing arrangements in those nodes, path length and propagation delays, differences in the radios, or wireless protocols (for example, if different protocols are used for the pathways), among other things.

In alternate embodiments, the originating node may schedule the timing of the transmission of information to the destination node, e.g., such that transfer over the two pathways is not substantially simultaneous but still provides redundancy. For example, the originating node can send information to the destination node at time T over a first pathway and schedule transmission of that same information over a second pathway at time T+N.

An intermediate node, such as wireless node 210 in pathway HG in the foregoing example, that receives information from the originating node inspects that information to determine if it is destined for another node. The intermediate node may inspect the destination address embedded in the information and/or a path identifier specifying, e.g., the wireless segments over which the originating node intended that information to travel. The intermediate node forwards that information to the destination node, if that destination node is in range. It may also forward that information to a further intermediate node, e.g., one which it selects in accordance with the aforementioned destination address, path identifier, and/or a wireless network topology. In some cases, the intermediate node may forward information based on a predetermined algorithm or rules, such as one requiring that information coming from node 208 is always forwarded to node 212.

In the illustrated embodiment, the wireless nodes 208-216 employ multiple channels on some segments and/or pathways. Hence, the transmission of information from wireless node 208 to wireless node 212 over pathway HG, for example, involves the transmission of information over two or more channels from wireless node 208 to wireless node 210 (wireless segment H) and over two or more channels from node 210 to node 212 (wireless segment G). In order to effect transmission over multiple channels, the originating node transmits the data at multiple frequencies, or in different frequency bands, to another wireless node (e.g., a destination or intermediate node).

Wireless nodes 208-216 typically operate in a peer-to-peer fashion, either of those two communicating wireless nodes (and its associated control device, if any) capable of initiating communication with the other wireless node (and their associated control devices, if any). Wireless nodes are also typically capable of initiating communications at virtually any time, subject to the strictures of the applicable wireless protocol. For example, in some implementations the wireless network may use a timing or scheduling protocol in which communications are prohibited in selected time periods for power management or other purposes.

The information flowing between wireless nodes 208-216 may serve many different purposes in a control system or other contexts. For example, a device associated with one such wireless node may transmit—e.g., via the pathways described above, or otherwise—status, health, critical event, safety and/or other system management information to another device associated with another wireless node, e.g., one that executes a system monitor application. Thus, upon entering an alarm or fault state, that device reports the event to the system monitor via a wireless link, e.g., as described above. As another example, a control device associated with a wireless node may transmit—e.g., via the pathways described above or otherwise—information about configuration changes (e.g., implemented by an operator via workstation, handheld device, or other login/access utility) to another device that is associated with another wireless node and that executes a change-tracking application.

In further embodiments, one or more wireless nodes, e.g., operating as described above, may form a control loop in a control system. For example, referring to FIG. 2, control device 208b may represent a sensor that measures a physical condition, such as the temperature of an enclosure. Measured temperatures can be wirelessly communicated to control device 212b over multiple pathways simultaneously or otherwise in accord with the techniques previously described. Control device 212b may be a controller, for example, that executes a control algorithm to maintain the temperature of the enclosure at a specified value. Continuing the example, control device 212b issues commands to control device 226 (e.g., an actuator) that adjusts the level of heat applied to the enclosure (e.g., by regulating a feed line for a boiler in thermal communication with the enclosure, or by other means). The increased temperature of enclosure is sensed by the sensor in control device 208b, providing feedback that completes the control loop. As such, real-time data relevant to the operation of the control loop flows across, among other things, wireless segments between wireless nodes 208 and 212. In this case, the wireless nodes wirelessly transmit temperature measurements, though in other cases the wireless nodes may wirelessly transmit control commands, settings, configuration data, or other data within the control loop.

As those skilled in the art will understand, the foregoing is merely one example of a process control application and/or control loop. A wide variety of other implementations are possible, including those involving additional numbers and types of control devices that form real-time control loop(s) or otherwise and that implement any of a variety of control strategies, e.g., defined by proportional integral derivative (PID) control, sequential function charts, ladder logic programming, and/or otherwise.

EXAMPLE

An exemplary wireless network in accordance with the foregoing was configured and tested as described below. It should be understood that the following description of is provided for illustrative purposes only.

SUMMARY

Radio equipment comprised 802.11s (802.3 Ethernet over Wireless) compatible wireless units ("Radio Units").

An existing wired Peer-Peer testbed was used. The testbed comprised three version 10.4 Tricons™, fitted with model 4351B TCM communication modules. Node 1, fitted with four TCMs, linked via the first TCM pair and two network switches to a Node 2 Tricon fitted with two TCMs. Node 1 linked via the second TCM pair and a further two network switches to another Node 2 Tricon likewise fitted with two TCMs. The two Node 2 Tricons are referred to as N2X and N2Y.

The Tristation™ 4.5 test application comprised a single statement text program including multiple Peer-Peer send and receive blocks and performance measurement. If N2X and N2Y had matching configurations, measured wired Peer-Peer performance between N1 and N2X, and N1 and N2Y, was the same. Alternatively, the test application can be implemented utilizing other conventional programming techniques, including for example function block format programming, as modified by and in accordance with the teachings hereof.

Substituting N2X left and right wired links and switches for separate redundant mesh radio networks, each operating at different selected frequency, yielded the same measured performance for N2X and N2Y. And no Peer-Peer errors or Triconex Enhanced Diagnostic Monitor (EDM) CRC errors or timeout were detected, after several hours run.

Mesh links could be disabled and enabled without errors or detectable effect on Peer-Peer performance. Only on degrading to single radio link, and almost fully disconnecting a radio antenna, could a quantity of dropped radio packets sufficient to yield Peer-Peer errors and slow Peer-Peer data update be induced.

Tricon-to-radio maximum bandwidth requirements were estimated at 5.5 megabits per second, incurred with the most asymmetric Peer-Peer configuration (i.e., one Tricon sending single block to maximum 50 other Tricons, and receiving the same).

Testbed

A Tricon (or, alternatively, Trident™) node can send up to 50 Peer-Peer blocks to other nodes. Each block can transfer up to thirty-two 32-bit integers. The same quantities can be received. Send and receive block identifiers range 1 to 99. The highest allowable, set in Tristation, is currently 50.

Figure 6A:
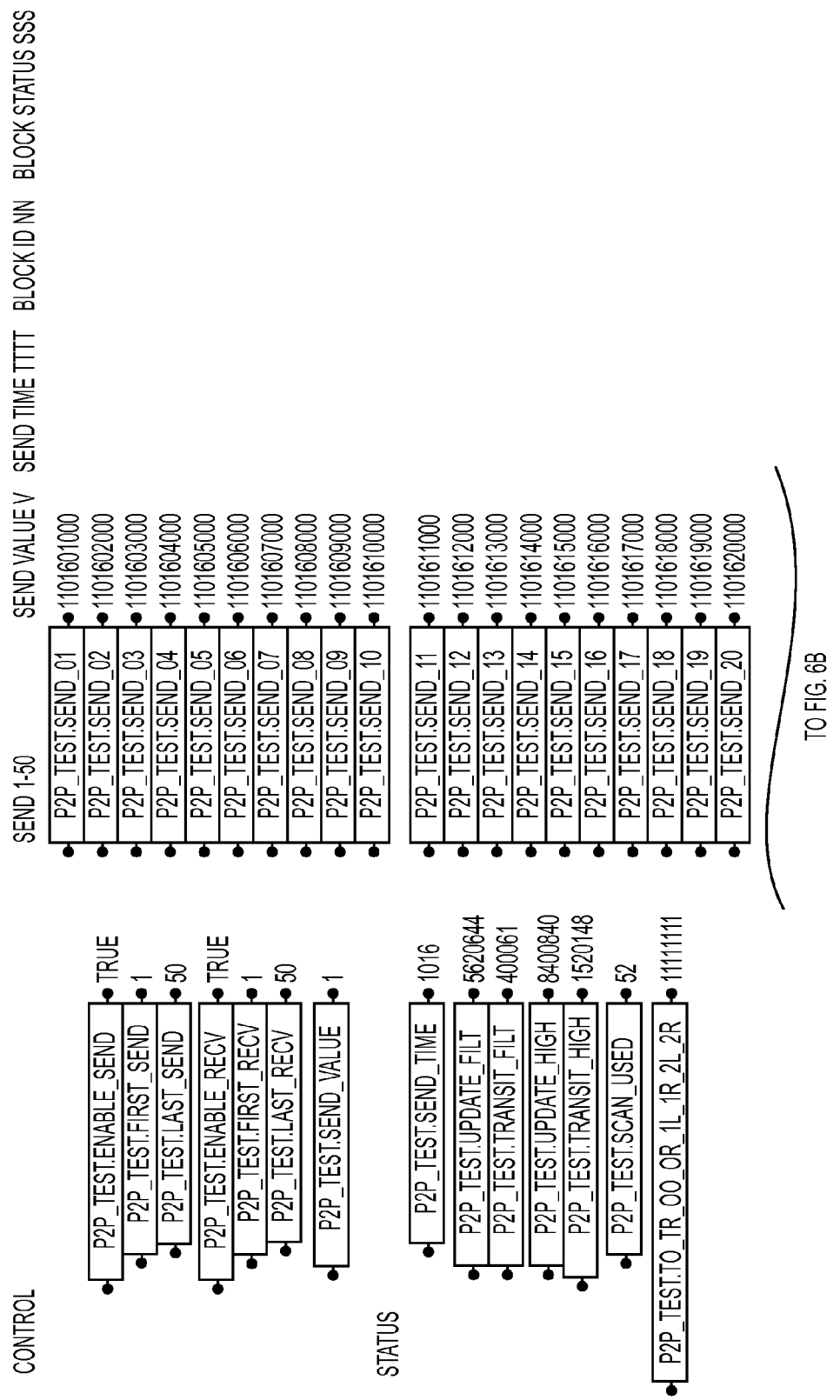

Tristation controller panel sheets, as shown in FIGS. 5 and 6, were used to control the test application and monitor status. The application includes 99 send blocks, with identifiers 1 to 99. These could be selectively enabled, via control tags for the first and last send block identifier. Same for receive. The number of integers sent per block, 1 to 32, could be specified.

The default arrangement was for N1 to be sending and receiving blocks 1 to 50, each with maximum 32 integers. With N2X handling blocks 1 to 25, and N2Y handling blocks 26 to 50.

Block scheduling was found to be unnecessary. Rather, blocks within the selected first-to-last identifier range were kept enabled. The Tricon internally handles cycling round the blocks, sending up to 5 per Tricon scan. Whether a block was sent would depend on if the Tricon had a free slot in its internal 10-slot pending send list, when the block executes. Blocks clear from the list when the transaction completes.

The program included rentable send block counters for sent/acknowledged/error, as well as delta between sent and acknowledge counters. With this configuration, sent and acknowledge counters accumulate continuously, as do EDM send and receive counters. Error counter remains zero, as does EDM CRC error counter and timeout flags. Unless reset, delta remains between 0 and 10, according with the 10-entry pending send list. A run yielded around 10 million sends and no errors or timeout, for all three Tricons.

Of the 32 integers per block, only the first was active. Whether 1 or 32 integers were sent had no bearing on measured performance.

Several items of data were packed into the integers displayed on each controller panel sheet. This made best use of the possible number of live update tags per sheet. This extended to packing data into the single sent integer. It was formatted V TTTT NN:

V is a sent 0 or 1 value, default 1. This may be changed, and observed in the destination Tricon.

TTTT is current time. Comprises least significant digit of current seconds (0 to 9). And current milliseconds (000 to 999). So, 0000 to 9999 milliseconds.

NN is block identifier (01 to 99). Block identifiers are included to check for example that data from send block 13, arrives at receive block 13.

Controller panel sheet 1, shown in FIG. 5, provides an overview. Sheet 2, shown in FIG. 6, displays V MT NN SSS, for each block, where SSS is appended send or receive block status as below. In this way, a dynamic overview of 50 send or receive blocks is obtained.

| Type | Send | Receive |
|---|---|---|
| OK | 0 Connected to a controller node, ready to SEND | 0 Ready to receive data from sending controller |
| | 1 SEND initiated with SENDFLG set to 1 | 1 New data received, ready for processing |
| | 2 SEND function is busy sending data | |
| | 3 Last SEND completed (receiving node has received SEND data) | |
| | 4 SEND completed and new SEND initiated | |
| Error | 100 Not connected to controller node | |
| | 101 Last SEND failed (communication problem with receiving node) | |
| | 102 Invalid SENDID, RECVNODE, or RECVID input | 102 Invalid RECVID, SENDNODE, or SENDID input |
| | 103 Mismatched data type or number of values in SEND and RECV function calls | 103 Mismatched data type or number of values in SEND and RECV function calls |
| | 104 Number of values specified by input N is out of range | |
| | 105 More than one SEND function has same SENDID | 105 More than one RECV function has the same RECVID |

If sheet 2 is observed, cycling of the Tricon internal scheduler is visible. Regarding SSS, only 0-4 send and 0/1 receive status sequencing was observed. No error codes 100 and above.

At the destination, how often a changed TTTT value was received was monitored, to determine update period (time taken to cycle round the receive blocks).

Received TTTT was compared with our own, to determine transit time (how delayed the data is, once it arrives). Tricon time synchronization was enabled, so the systems were synchronized to within 25 ms.

Both values were found to be variable. So as well as displaying raw values, the values were filtered, and the highest raw values seen were recorded. Filtered and highest values could be reset to raw values.

Also, update period and transit time were summed, and the highest sum seen was recorded. This revealed that highest update period and highest transit time could occur together. So it would be legitimate to say that the two summed, was total delay to the data.

Time at which highest sum seen, was also recorded (in HHMMSSmmm integer format). This was so to check for any common-cause external events affecting all three Tricons.

The above is done separately for the first and last selected block. For example 1 and 50, for N1. These indicate communication performance to N2X and N2Y, respectively.

For N2X and N2Y, first and last block are both communicating with N1. So only the first figures are noted.

This arrangement means that an identical program for all three Tricons can be used. Only exception was initial values for the tags listed under Control, on the controller panel sheets. The arrangement also means that there can be used identical controller panel sheets, for all three Tricons. These are duplicated in the emulator panel for offline checks, or emulated Peer-Peer test.

First and last values are each packed into a single integer, in the format FFFF LLLL.

The Tricon scan used is displayed. This rose by couple of milliseconds at most, when 50 blocks were selected as opposed to none. Block processing is mainly handled asynchronously by the TCMs.

Reported Peer-Peer monitoring status is also displayed, for this node and the other node (1 and 2 for N1, 2 and 1 for N2X and N2Y). This comprised communication OK (single link), and communication redundant (dual links).

Also TCM port status, comprised Net1 Left, Net1 Right, Net2 Left and Net2 Right. Peer-Peer was configured to use default Net1.

Lastly, slot status for the four TCMs, of which N2X and N2Y had only two, is displayed.

Performance

Tricon scan and Peer-Peer performance can be maximized by minimizing allocated Tricon tag memory. Specifically, aliased memory or physical I/O tag data accessible by external devices. Each scan, the Tricon main processors transfer this data to the TCMs. Minimizing the data allows the main processors to concentrate on program execution, and TCMs to concentrate on communication including Peer-Peer.

Lowering memory allocation to the minimum allows the Tricon scan period to be set to 60 ms, of which about 50 ms used.

With 60 ms scan period, N1 exhibited a typical filtered update period of 578 ms, with highest of 840 ms after a run. Figures for N2X and N2Y were typical filtered 1193 ms, highest 1440 ms. These approximately double because N2X received blocks 1-25, followed by lull while N2Y received blocks 26-50, and vice-versa.

Assuming each block is sent via standard 1518-byte Ethernet II frame, and acknowledged by standard 20-byte TCP header, for total of (1518+20)×8=12304 bits, used bandwidth in bits-per-second for each node, e.g., deduced as below.

Sent blocks per second were determined by monitoring send counter for 30 seconds. These accorded with N1 received blocks per second. And represented around 2.5 blocks per scan, being half the maximum of 5.

| N1 | Blocks sent per second | 42 |
|---|---|---|
| | Blocks received per second from N2X | 25 blocks/578 ms × 1000 = 43 |
| | Blocks received per second from N2Y | 25 blocks/578 ms × 1000 = 43 |
| | Total blocks per second | 42 + 43 + 43 = 128 |
| | Total bits per second | 128 blocks × 12304 bits = 1 574 912 |

| N2X | Blocks sent per second | 43 |
|---|---|---|
| | Blocks received per second from N1 | 25 blocks/1193 ms × 1000 = 21 |
| | Total blocks per second | 43 + 21 = 64 |
| | Total bits per second | 64 blocks × 12304 bits = 787 456 |

| N2Y | Blocks sent per second | 43 |
|---|---|---|
| | Blocks received per second from N1 | 25 blocks/1193 ms × 1000 = 21 |
| | Total blocks per second | 43 + 21 = 64 |
| | Total bits per second | 64 blocks × 12304 bits = 787 456 |

Observe how higher N1 bandwidth is due in part to receiving from N2X and N2Y in parallel. In some implementations, N1 would likely receive 1 block only from maximum 50 nodes (say 2X to 26X, and 2Y to 26Y), so gross parallel receive. And likely send 1 block only to each such node.

To simulate 2 of the 50, test was repeated, but with N2X sending block 1 instead of 1-25, and N2Y sending block 2 instead of 26-50, yielding the following N1 results. Extrapolating to a further 48 nodes yielded this required bandwidth estimate:

| N1 | Blocks sent per second | 45 |
|---|---|---|
| | Blocks received per second from N2X | 1 block/121 ms × 1000 = 8 |
| | Blocks received per second from N3X-N26X | 24 blocks × 8 = 192 |
| | Blocks received per second from N2Y | 1 block/121 ms × 1000 = 8 |
| | Blocks received per second from N3Y-N26Y | 24 blocks × 8 = 192 |
| | Total blocks per second | 45 + 8 + 192 + 8 + 192 = 445 |
| | Total bits per second | 445 blocks × 12304 bits = 5 475 280 |

To simulate also N2X and N2Y receiving 1 block only, test was repeated, but with N1 sending block 1 and 2 instead of 1-50, yielding the following N2X and N2Y results:

| N2X | Blocks sent per second | 7 |
|---|---|---|
| | Blocks received per second from N1 | 1 block/117 ms × 1000 = 9 |
| | Total blocks per second | 7 + 9 = 16 |
| | Total bits per second | 16 blocks × 12304 bits = 196 864 |

| N2Y | Blocks sent per second | 6 |
|---|---|---|
| | Blocks received per second from N1 | 1 block/138 ms × 1000 = 7 |
| | Total blocks per second | 6 + 7 = 13 |
| | Total bits per second | 13 blocks × 12304 bits = 159 952 |

Radios

Five 802.11(s)-compatible radios were tested, comprising three dual-channel radios, and two single-channel radios. Two dual-channel radios were used for N1 and N2X left, with two single-channel radios used for N1 and N2X right. Third dual-channel radio mounted on test-stand constituted an optional rebroadcast (relay) station.

Figure 7:
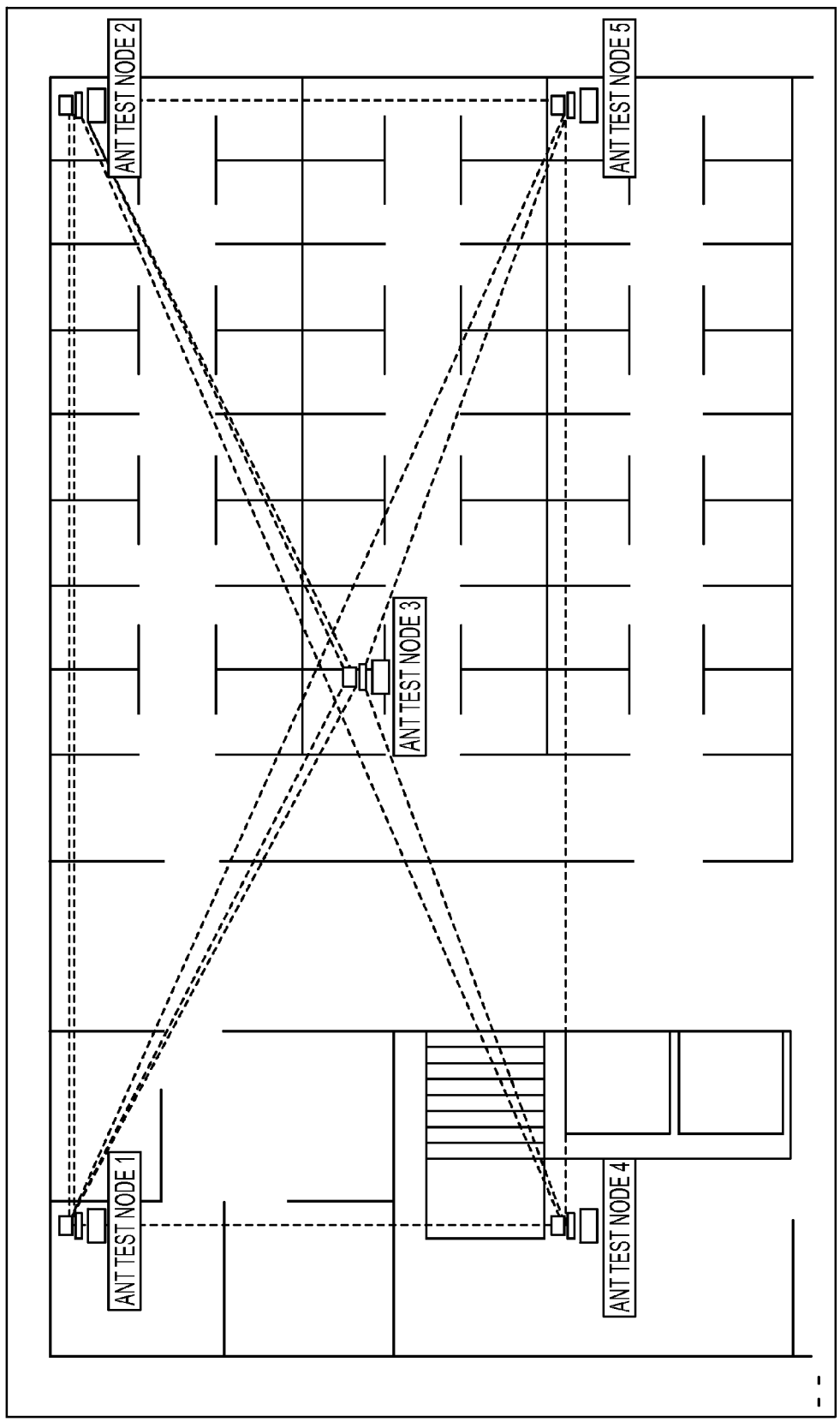
FIGS. 7 and 8 are network mesh diagrams of systems according to the invention.
Figure 8:
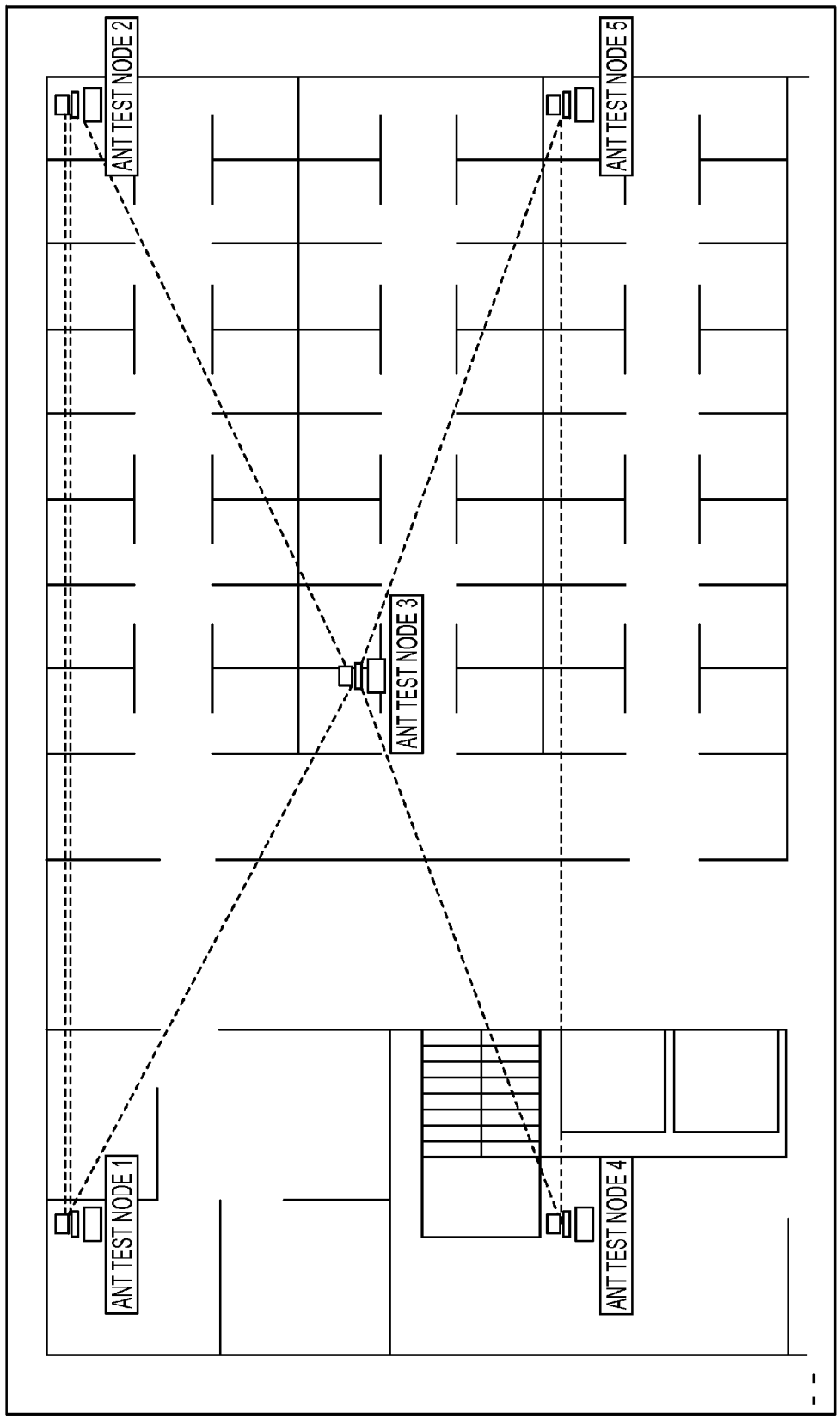

FIGS. 7 and 8 display two network mesh diagrams that are arranged thus:

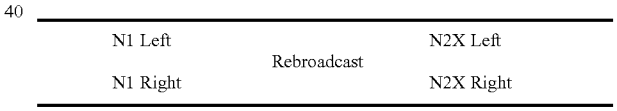

Mesh connectivity was configured initially as shown in FIG. 7. Dual-radio to dual-radio links are shown dual-dashed, otherwise single-dashed. Single-channel radios, and first channel of dual-channel radios, were configured to operate at one frequency. Second channel of dual-channel radios were configured to operate at different frequency.

After confirming that this setup worked it was modified to remove connectivity between left and right, as shown in FIG. 8. And different frequencies were selected for left and right. Specifically 5.745 and 5.825 GHz (channel numbers 149 and 165) for left dual-radios, 5.785 GHz (channel number 157) for right single-radios. Optional rebroadcast station dual-radio was configured with first channel 5.745 GHz, second channel 5.785 GHz. This resulted in separate left and right mesh networks, appearing in FIG. 8 as an inverted and non-inverted triangle.

It is envisaged that deployed, this network would comprise six dual-channel radios, including separate rebroadcast stations for left and right network. Left network would use two frequencies, right network would use two different frequencies, for a total of four, providing radio-channel quad redundancy. Rebroadcast (relay) stations are generally advantageous if no line of sight between nodes.

Described above are methods and apparatus meeting objects and goals set forth above. Those skilled in the art will appreciate that the embodiments shown in the drawings and described in the accompanying text are merely examples and that other embodiments, incorporating modifications and changes therein and including combinations of foregoing embodiments, fall within the scope of the invention. Thus, by way of non-limiting example, it will be appreciated that the steps depicted in the Figures may be performed in any suitable order, the ordinal numbering of those steps herein notwithstanding, as it provided only for explicative purposes.

In view thereof, what we claim is:

1. A control network, comprising:
   a first node associated with at least one device in a control system,
   a second node associated with at least one device in the control system,
   wherein the first node is configured to wirelessly transmit information for substantially simultaneous transfer over at least two pathways to the second node
   wherein at least one of the at least two pathways is through a third node that comprises a relay node unassociated with a controller, an actuator, a sensor, a transmitter, or a positioner.

2. The control network of claim 1, wherein the control network comprises a plurality of nodes interconnected by network segments extending between pairs of the plurality of nodes, each of the at least two pathways being defined by one or more network segments.

3. The control network of claim 2, wherein the first node is configured to wirelessly transmit information over at least one network segment of one of the at least two pathways using at least two different radio channels.

4. The control network of claim 3, wherein the at least two different radio channels use different frequencies from one another.

5. The control network of claim 1, wherein any of the at least one device associated with the first node and the at least one device associated with the second node forms at least part of a control loop operating to at least one of (i) maintain the control system at a desired level or (ii) drive it to that level, as a function of one or more measured values and one or more setpoints.

6. The control network of claim 1, wherein the at least one device associated with the first node comprises any of a controller and a wireless communications module communicatively coupled to a controller.

7. The control network of claim 6, wherein the at least one device associated with the second node comprises any of an actuator, a sensor, a transmitter, and a positioner (collectively referred to as "the associated control device").

8. The control network of claim 7, wherein the controller and the associated control device form at least part of a control loop operating to at least one of (i) maintain the control system at a desired level or (ii) drive it to that level, as a function of one or more measured values and one or more setpoints.

9. The control network of claim 1, wherein both the first and second nodes are capable of initiating wireless communications with one another.

10. The control network of claim 1, wherein the first node is configured to wirelessly transmit information for substantially simultaneously transfer over at least three pathways to the second node.

11. The control network of claim 1, wherein any of the at least one device associated with the first node and the at least one device associated with the second node comprises a control device.

12. The control network of claim 1, wherein the first node is configured to wirelessly transmit information for substantially simultaneous transfer over at least two pathways to the second node by broadcasting the information to nodes in the control network that are in a transmission range of the first node.

13. The control network of claim 1, wherein the first node is configured to wirelessly transmit information for substantially simultaneous transfer over at least two pathways to the second node by wirelessly transmitting the information to at least two selected nodes in the control network that are in a transmission range of the first node.

14. A node in a control network having a plurality of nodes, comprising:
   a control device communicatively coupled to a communications module configured to wirelessly transmit information to at least one other node,
   the communication module being operable to wirelessly transmit information for substantially simultaneous transfer over at least two pathways to the second node
   wherein at least one of the at least two pathways is through a third node that comprises a relay node unassociated with a controller, an actuator, a sensor, a transmitter, or a positioner.

15. The control network of claim 14, wherein the control network comprises a plurality of nodes interconnected by network segments extending between pairs of the plurality of nodes, each of the at least two pathways being defined by one or more network segments.

16. The network node of claim 15, wherein the communication module comprises one or more radios collectively providing a plurality of radio channels for wirelessly transmitting information over at least one segment of one of the at least two pathways to the at least one other node.

17. The network node of claim 16, wherein the plurality of radio channels comprises at least two channels using different frequencies from one another.

18. The network node of claim 14, wherein the control device comprises any of a controller, an actuator, a sensor, a transmitter, and a positioner.

19. The network node of claim 14, wherein the control device forms at least part of a control loop operating to at least one of (i) maintain a control system at a desired level or (ii) drive it to that level, as a function of one or more measured values and one or more setpoints.

20. The network node of claim 14, wherein both the network node and the at least one other network node are capable of initiating wireless communications with one another.

21. The network node of claim 14, wherein the communications module is operable to wirelessly transmit information for substantially simultaneous transfer over at least three pathways to the at least one other network node.

22. The network node of claim 14, wherein the communication module is operable to wirelessly transmit information for substantially simultaneous transfer over at least two pathways to the at least one other node by broadcasting the information to nodes in the control network that are in a transmission range of network node.

23. The network node of claim 14, wherein the communication module is operable to wirelessly transmit information for substantially simultaneous transfer over at least two pathways to the at least one other node by wirelessly transmitting the information to at least two selected nodes in the control network that are in a transmission range of the network node.

24. A method of communicating information between a first and a second node in a control network, each of the first and second nodes being associated with at least one device in a control system, the method comprising:
with the first node, wirelessly transmitting information for substantially simultaneous transfer to the second node via first and second pathways ("redundant pathways") wherein at least one of the redundant pathways is through a third node unassociated with a controller, an actuator, a sensor, a transmitter, or a positioner.

25. The method of claim 24, wherein the control network comprises a plurality of nodes interconnected by network segments extending between pairs of the plurality of nodes, each of the first and second pathways being defined by one or more network segments.

26. The method of claim 24, further comprising wirelessly transmitting information from the first node to the second node over at least one segment of one of the redundant pathways using a plurality of radio channels.

27. The method of claim 26, wherein the plurality of radio channels comprises at least two channels using different frequencies from one another.

28. The method of claim 24, further comprising operating a control loop to at least one of (i) maintain the control system at a desired level or (ii) drive it to that level, as a function of one or more measured values and one or more setpoints, wherein the control loop comprises at least one of the devices associated with the at least one of the first and second nodes.

29. The method of claim 28, wherein at least one of the devices associated with the at least one of the first and second nodes comprises any of a controller and a wireless communications module communicatively coupled to a controller.

30. The method of claim 29, wherein at least one of the devices associated with at least one of the first and second nodes comprises any of an actuator, a sensor, a transmitter, and a positioner (collectively referred to as "the associated control device").

31. The method of claim 30, wherein the controller and the associated control device form at least part of a control loop operating to at least one of (i) maintain the control system at a desired level or (ii) drive it to that level, as a function of one or more measured values and one or more setpoints.

32. The method of claim 24, wherein both of the first and second nodes are capable of initiating wireless communications with one another over the control network.

33. The method of claim 24, further comprising, with first node, wirelessly transmitting information for substantially simultaneous transfer to the second node via first, second and third pathways ("triple redundant pathways").

34. The method of claim 24, wherein wirelessly transmitting information for substantially simultaneous transfer to the second node via redundant pathways comprises, with the first node, broadcasting the information to nodes in the control network that are in a transmission range of the first node.

35. The method of claim 24, wherein wirelessly transmitting information for substantially simultaneous transfer to the second node via redundant pathways comprises, with the first node, wirelessly transmitting the information to at least two selected nodes in the control network that are in a transmission range of the first node.

* * * * *